(12) United States Patent
Rhymes et al.

(10) Patent No.: US 10,767,620 B2
(45) Date of Patent: Sep. 8, 2020

(54) WATER CURRENT POWER GENERATION SYSTEMS

(71) Applicant: Tidal Generation Limited, Stafford, Staffordshire (GB)

(72) Inventors: Jonathan Rhymes, Beistol (GB); Gregory Pittam, Bristol (GB); Simon Harper, Bristol (GB); James Harrison, Bristol (GB)

(73) Assignee: GE Energy (UK) Limited, Altrincham, Cheshire (GB)

( * ) Notice: Subject to any disclaimer, the term of this patent is extended or adjusted under 35 U.S.C. 154(b) by 57 days.

(21) Appl. No.: 15/107,208

(22) PCT Filed: Dec. 22, 2014

(86) PCT No.: PCT/GB2014/053824
§ 371 (c)(1),
(2) Date: Jun. 22, 2016

(87) PCT Pub. No.: WO2015/097467
PCT Pub. Date: Jul. 2, 2015

(65) Prior Publication Data
US 2016/0333848 A1    Nov. 17, 2016

(30) Foreign Application Priority Data
Dec. 23, 2013   (GB) .................................. 1322964.6

(51) Int. Cl.
*F02B 15/00*   (2006.01)
*F03B 15/08*   (2006.01)
(Continued)

(52) U.S. Cl.
CPC .............. *F03B 15/08* (2013.01); *F03B 13/10* (2013.01); *F03B 15/06* (2013.01); *F03B 15/16* (2013.01);
(Continued)

(58) Field of Classification Search
CPC .......... F03B 13/10; F03B 15/06; F03B 15/08; F03B 15/16; F03B 17/06; F03B 17/061;
(Continued)

(56) References Cited

U.S. PATENT DOCUMENTS 2,501,696 A * 3/1950 Souczek ............... F03B 17/061
290/43
7,989,984 B2 * 8/2011 Draper ..................... H02B 7/00
290/42
(Continued)

FOREIGN PATENT DOCUMENTS

GB    2483315 A     3/2012
GB    2485282 A *   5/2012 .............. F03B 15/16
(Continued)

OTHER PUBLICATIONS

Combined Search and Examination Report issued in connection with corresponding GB Application No. 1322964.6 dated Jul. 22, 2014.
(Continued)

*Primary Examiner* — Julio C. Gonzalez
(74) *Attorney, Agent, or Firm* — Dority & Manning, P.A.

(57) ABSTRACT

A water current power generating system includes a support structure located on a bed of a body of water. A power generating apparatus, such as a water current turbine device, is mounted on the support structure, by way of a mounting portion. The system also includes a measurement unit operable to determine operating information relating to operation of the system, and a controller operable to determine loading on the system from such operating information, and to adjust a controlled parameter of the system such that loading on the system falls below a predetermined threshold value.

11 Claims, 5 Drawing Sheets

(51) Int. Cl.
*F03B 17/06* (2006.01)
*F03B 15/06* (2006.01)
*F03B 13/10* (2006.01)
*F03B 15/16* (2006.01)
*H02K 7/18* (2006.01)
*H02P 9/00* (2006.01)

(52) U.S. Cl.
CPC ............ *F03B 17/06* (2013.01); *F03B 17/061* (2013.01); *H02K 7/1823* (2013.01); *H02P 9/008* (2013.01); *F05B 2220/32* (2013.01); *F05B 2240/97* (2013.01); *F05B 2260/70* (2013.01); *F05B 2270/1033* (2013.01); *F05B 2270/327* (2013.01); *F05B 2270/335* (2013.01); *Y02E 10/226* (2013.01); *Y02E 10/28* (2013.01); *Y02E 10/38* (2013.01)

(58) Field of Classification Search
CPC .............. F05B 2220/32; F05B 2240/97; F05B 2260/70; F05B 2270/1033; F05B 2270/327; F05B 2270/335
USPC ...................................................... 290/43, 54
See application file for complete search history.

(56) References Cited

U.S. PATENT DOCUMENTS

| | | | | |
|---|---|---|---|---|
| 8,022,566 B2* | 9/2011 | Loh | ....................... | F03D 7/0204 290/44 |
| 2007/0248451 A1* | 10/2007 | Yaras | ...................... | F03B 17/06 415/4.4 |
| 2010/0332041 A1* | 12/2010 | Hunt | ....................... | B63B 21/50 700/287 |
| 2013/0052011 A1* | 2/2013 | Badcock | ............... | F03B 13/264 416/1 |
| 2013/0211453 A1 | 8/2013 | Lenke et al. | | |
| 2013/0214533 A1* | 8/2013 | Hupe | ...................... | F03B 13/10 290/43 |
| 2013/0320675 A1* | 12/2013 | Vigars | ....................... | F03B 5/00 290/43 |
| 2015/0069760 A1* | 3/2015 | Paakkinen | .............. | F03B 13/20 290/53 |
| 2015/0295481 A1* | 10/2015 | Harris | .................. | H02K 16/005 290/43 |
| 2016/0201641 A1* | 7/2016 | Handa | ................... | F03B 17/061 290/43 |

FOREIGN PATENT DOCUMENTS

| | | | | |
|---|---|---|---|---|
| GB | 2486700 A | * | 6/2012 | ................ F03B 5/00 |
| WO | 2011/067586 A2 | | 6/2011 | |

OTHER PUBLICATIONS

Examination Report issued in connection with corresponding GB Application No. 1322964.6 dated Mar. 10, 2016.
Examination Report issued in connection with corresponding GB Application No. 1322964.6 dated Aug. 26, 2016.
Examination Report issued in connection with corresponding GB Application No. 1322964.6 dated Feb. 6, 2017.
International Search Report and Written Opinion issued in connection with corresponding PCT application PCT/GB2014/53824 dated Mar. 2, 2015.

* cited by examiner

WATER CURRENT POWER GENERATION SYSTEMS

TECHNICAL FIELD

Embodiments of the present invention relate to water current power generation systems and, in particular, to a method and apparatus for controlling the loading on a water current power generation system during operation.

BACKGROUND

It is widely known that easily accessible resources of fossil fuels are declining. In addition, the impact of the use of fossil fuels upon the environment has become increasingly apparent. As a result of this, it has become imperative that viable alternative energy sources are used as effectively and efficiently as possible. The use of turbines to capture the power of water flow, such as tidal, river and ocean current flows is becoming a viable source of alternative energy. The turbine equipment used to capture such water flow energy typically includes a rotor assembly connected via a drivetrain to a shaft driven power generator. The rotor assembly includes a plurality of rotor blades that are driven by the water flow, so as to turn an input shaft of the drivetrain, and hence the generator.

Existing turbine systems are arranged to operate at a nominal operating point, typically the power being generated. This operating point is chosen in order to balance power output requirements with the physical requirements of building the system. For example, it is possible to model and predict with some certainty steady state loading for a range of flow speeds and power outputs. This loading modeling is then used to determine the design and specification of the system components, for a desired operating point of the equipment, such that the components of the system that are able to deal with such steady state loading, and that are economically viable. The loading capabilities of the components are then typically uprated from this nominal design point, in order that transitional loading, such as that caused by waves or other turbulence, can be accommodated. This results in equipment that is able to withstand higher loading than is often experienced in practice.

BRIEF DESCRIPTION

According to one aspect of the present invention, there is provided a method for controlling a water current power generation system consisting of a support structure located on the bed of a body of water, and a power generating apparatus mounted on the support structure and operable to generate electrical power from a water current flowing past the system, the method including determining operating information relating to operation of the power generating apparatus, determining loading on the power generation system from such operating information, and adjusting a controlled parameter of the power generating apparatus such that loading on the power generation system falls below a predetermined threshold value.

According to another aspect of the present invention, there is provided a water current power generating system, the system including a support structure for location on a bed of a body of water, a power generating apparatus adapted for mounting on the support structure and operable to generate electrical power from a water current flowing past the system, a measurement unit operable to determine operating information relating to operation of the system, and a controller operable to determine loading on the power generation system from such operating information, and to adjust a controlled parameter of the power generating apparatus such that loading on the power generation system falls below a predetermined threshold value.

According to another aspect of the present invention, there is provided a control system for a water current power generating system consisting of a support structure for location on a bed of a body of water, and a power generating apparatus adapted for mounting on the support structure and operable to generate electrical power from a water current flowing past the system, the control system including a measurement unit operable to determine operating information relating to operation of a water current power generating system, and a controller operable to determine loading on such a power generation system from such operating information, and to adjust a controlled parameter of such power generating apparatus such that, in use, loading on the power generation system concerned falls below a predetermined threshold value.

In one example, the operating information includes operating parameter information relating to at least one operating parameter of the system. The operating parameter may be chosen from output power, generator rotational speed, generator torque, rotor rotational speed, and rotor blade pitch angle.

In one example, the operating information includes operating condition information relating to at least one operating condition of the system. The operating condition may be chosen from system loading, inclination of the power generating apparatus, rate of change of inclination of the power generating apparatus, relative inclination between the power generating apparatus and the support structure, rate of change of relative inclination between the power generating apparatus and the support structure, flow speed, wave height, wave period, and turbulence measurements.

In one example, the at least one controlled parameter is chosen from output power, generator torque, generator rotational speed, rotor rotational speed and rotor blade pitch angle.

In one example, the method includes, in advance of power generating operation of the system, storing load model information relating to expected loading on the system during such operation, wherein determining loading on the system includes combining the operating information and the model information to generate expected loading information. Such load model information may include steady state load information. Such load model information may include transient load information. Such load model information may include information relating to a predetermined range of operating conditions.

In one example, adjusting the controlled parameter of the system causes the power output of the system to rise.

In one example, adjusting the controlled parameter of the system causes the power output of the system to fall.

DETAILED DESCRIPTION

Figure 1:
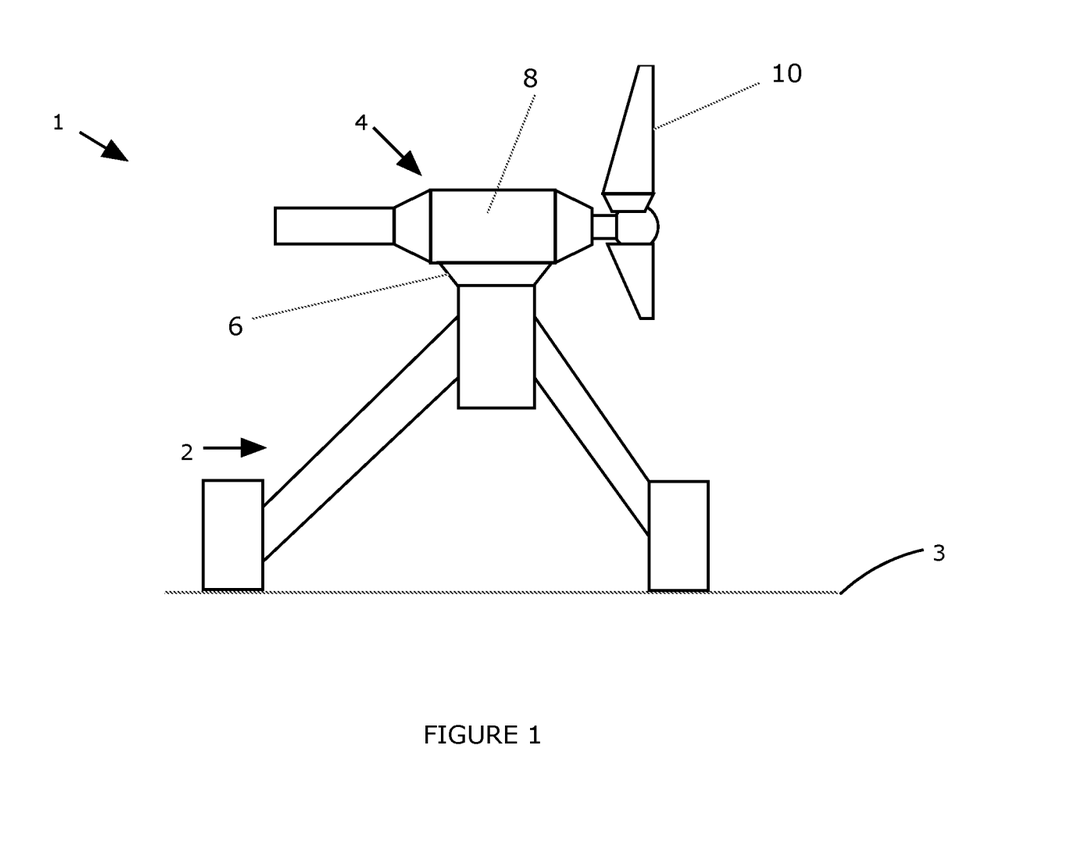
FIG. 1 is a schematic view of a water current power generation system.

FIG. 1 shows a water current power generation system 1 including a support structure 2 located on a bed 3 of a body of water. A power generating apparatus 4, such as a water current turbine device, is mounted on the support structure 2, by way of a mounting portion 6. It will be readily appreciated that the power generation system illustrated in FIG. 1 is merely exemplary and is shown to illustrate the principles of aspects of the present invention, which aspects may be applied to other examples of power generating system.

In the present example, the power generating apparatus 4 includes a main body 8, on which is rotatably mounted a rotor assembly 10. The rotor assembly 10 operates to drive an electricity generator, or other power generating device, housed in the main body 8. The power generating apparatus 4 may be adapted for releasable mounting on the support structure 2.

Figure 2:
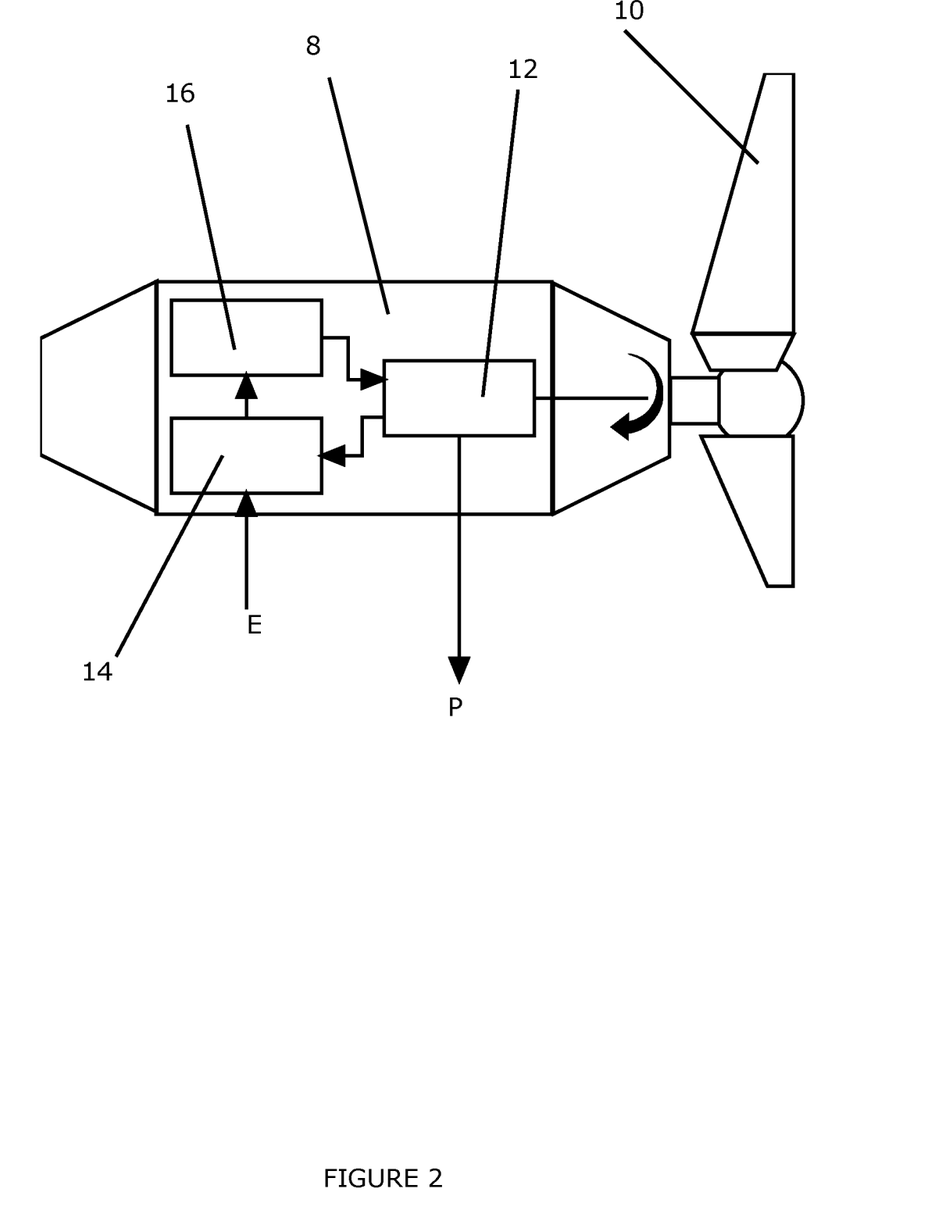
FIG. 2 is a schematic view of a power generating apparatus for use in the system of FIG. 1.

FIG. 2 schematically illustrates the power generating apparatus 4 of FIG. 1. As described, the rotor assembly 10 is mounted for rotation on the main body 8 of the apparatus 4. When in use, the rotor of the rotor assembly 10 is caused to rotate by water current flowing past and around the power generation system 1.

The rotor assembly 10 is arranged to transfer this rotational motion to a generator 12, via a drivetrain (not shown for the sake of clarity) which may include a gearbox and other components. As is well known and understood, the generator 12 generates electrical power P from the rotational motion provided by the rotor assembly 10.

In an embodiment, the power generating apparatus 4 also includes a measurement unit 14 and a control unit 16 housed in the main body 8 of the apparatus 4. The measurement unit 14 and control unit 16 may be provided together or separately, and may be provided at any convenient location.

The measurement unit 14 is operable to measure and determine operating information relating to the operation of the power generating apparatus 4. This operating information may relate to operating parameters of the power generating apparatus 4, for example power output from the generator, generator rotational speed, generator torque, rotor rotational speed, and/or rotor blade pitch angle. The operating information may also, or alternatively, relate to operating conditions of the power generating apparatus 4, for example loading, inclination of the power generating apparatus, rate of change of inclination of the power generating apparatus, relative inclination between the support structure and the power generating apparatus, rate of change of relative inclination between the support structure and the power generating apparatus, flow speed, wave height, wave period, and turbulence.

The measurement unit 14 receives measurements from the generator and from other sensors and instruments, as indicated by arrow E in the Figure. The other sensors and instruments are not shown in detail for the sake of clarity, and may be provided as part of the measurement unit 14 or distinct from that unit, depending upon the type of sensor/instrument and information being collected. The sensors can be any appropriate sensor or measuring device which provides suitable and relevant information. For example, the system may be provided with accelerometers, strain gauges, inclinometers and the like in addition to specific power and other electrical monitoring devices.

In one example, an inclinometer (or tilt sensor) is located in the power generating apparatus 4, and is operable to provide a measurement signal indicative of the inclination of the power generating apparatus 4. This inclination may be measured with respect to an arbitrary reference point, or may relate to the relative inclination of the power generating apparatus 4 with respect to the support structure 2. As the power generating apparatus 4 operates, the power generation system 1 is subject to loading from the water current and from the thrust imparted by the rotor. This loading tends to cause the support structure 2 to deflect, such that the inclination of the power generating apparatus 4 changes. In a well-designed system, such movements are small and are contained within well-defined constraints. In addition, or alternatively, the loading on the system may cause relative movement between the power generating apparatus 4 and the support structure 2, and the change in relative inclination between the two components of the power generation system 1 can also be measured.

Either measurement of inclination can be used to determine the loading (or an estimate of the loading) being experienced by the system. In particular, the inclination of the power generating apparatus is indicative of the mean loading over a predetermined time period. Changes in the inclination over an extended time period (for example over a few hours) can be used to determine the overall conditions in which the system is operating. Short term changes (of the order of minutes) can be used to determine loading due to transient changes in conditions.

One particular embodiment of the present invention makes use of only an inclinometer as a sensor from which to derive operating information for the power generating apparatus 4. Such an embodiment enables the estimation of loading on the system without the need for complex strain gauges and other sensors. The inclinometer may be provided by a specific sensor or by an accelerometer from which speed and distance measurements may be derived. The measurement of the inclination of the power generating apparatus 4, or of the relative inclination between the power generating apparatus 4 and the support structure 2 may relate to the angle of inclination, the change in that angle, the rate of change (speed) of that angle, and/or the rate of change of the speed (acceleration) of that angle.

The measurement unit 14 supplies operating information to the control unit 16. The control unit 16 makes use of the operating information provided by the measurement unit 14 to control the operation of the power generation system 1, as will be described below. In accordance with the principles of the present invention, this control is intended to ensure that the loading experienced by the system and components thereof is kept below a desired level, whilst maximizing the power output from the system.

It will be appreciated that references in the present description to "loading" are to be understood as relating to any type of loading on the system, whether that loading is structural, mechanical, electrical or thermal.

Figure 3:
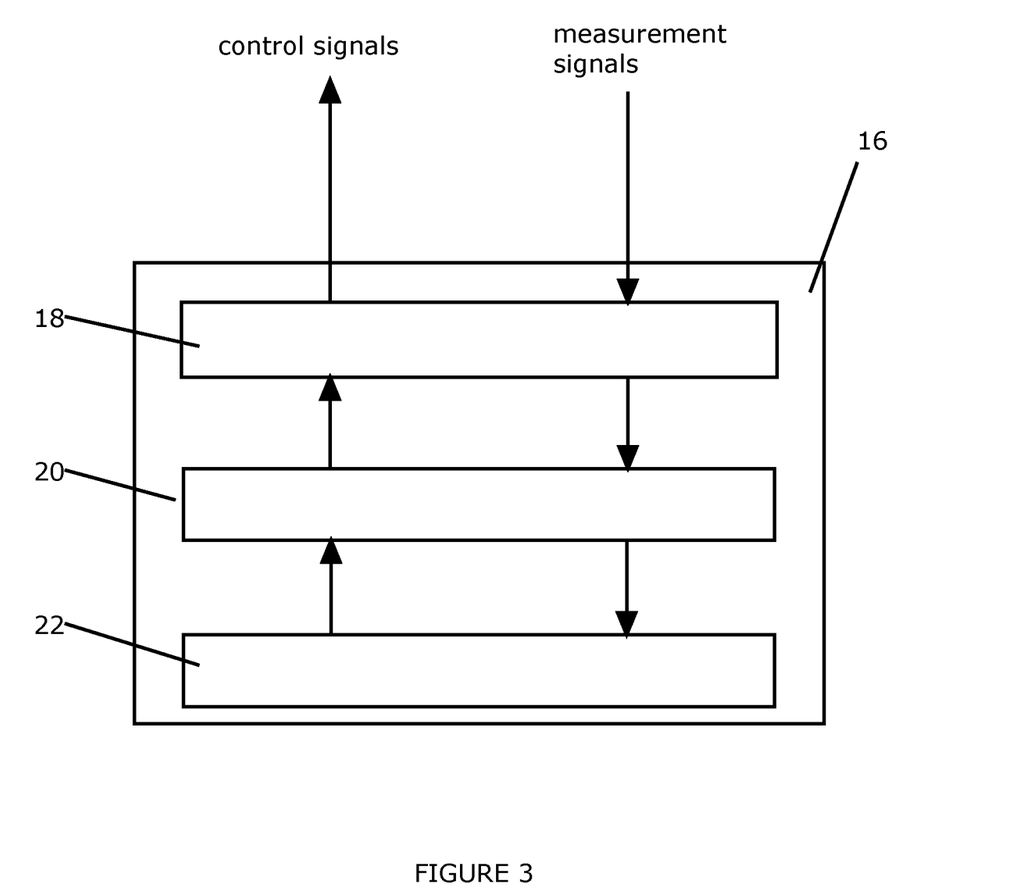
FIG. 3 is a schematic block diagram illustrating a controller embodying one aspect of the present invention.

FIG. 3 is a block diagram illustrating the control unit 16, which includes an input/output (1/O) controller 18, a processor 20, and a data memory/storage unit 22. The 1/O controller 162 is operable to control transfer of data, measurement and control signals to and from the control unit 16. The processor 20 is operable to store and retrieve data in the data storage device 22, to receive data from the measurement device 14, via the 1/O controller 18, and to issue control instructions to the generator 12 via the 1/O controller 18. The components of the control unit 16 may be provided by any elements and technologies suitable to provide the calculation and control operations described below.

Figure 4:
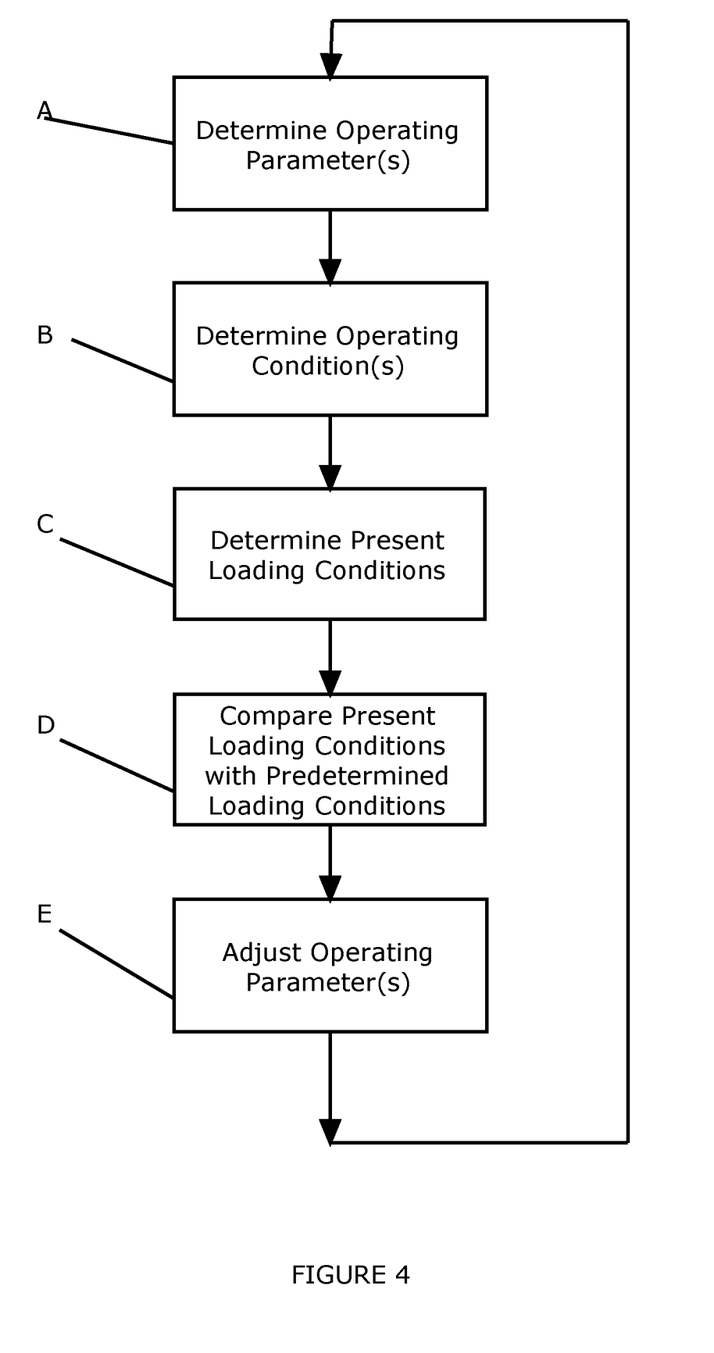
FIG. 4 is a flow chart showing steps in a method embodying another aspect of the present invention.

An example method embodying another aspect of the present invention is shown in the flow chart of FIG. 4. The measurement unit 14 operates to generate operating information relating to at least one operating parameter of the system (step A), for example power output from the generator, generator rotational speed, generator torque, rotor rotational speed, and/or rotor blade pitch angle. The operating information may be derived directly from measurements of the appropriate quantity, or calculated using appropriate measurements and modeling.

For example, the output power P of the generator 12 may be measured directly, or may be calculated from appropriate sensors and readings relating to the operation of the generator 12.

For example, the measurement unit 14 may measure generator torque and rotational speed, and then derive the output power P from those measurements.

The measurement unit 14 is also operable to determine (step B) operating information relating to at least one operating condition of the power generating system 1. The operating information may relate to loading on predetermined parts of the system, for example on the rotor assembly, drivetrain components, and/or support structure components, and/or to the flow condition of the water current in which the system is located. These flow conditions may include flow speed, wave height, wave period, flow direction, and/or any other conditions that are appropriate to characterize the flow. The condition information may also, or alternatively, relate to inclination of the power generating apparatus 4, and/or to relative inclination between the power generating apparatus 4 and the support structure 2.

The processor 20 receives the operating information (the parameter information and condition information) from the measurement unit 14. The processor 20 determines, from this received operating information, loading, or an estimate thereof, on the system (step C). Data relating to the loading may be stored in the data storage device 22.

The processor 20 compares (step D) the determined loading with predetermined desired loading, and then adjusts controlled operating parameters of the power generating apparatus 4 in dependence with the result of the comparison. Examples of such control are given below. Control of the power generating apparatus 4 involves adjusting the operating point of one or more parameters of the power generating apparatus 4. For example, the desired power output P, the pitch of the blades of the rotor assembly, and the desired generator torque may all be adjusted to meet the control requirements of the processor. The result is that the processor 20 operates to control the power generating apparatus 4 in order to control the loading experienced by the system as a whole.

Loading on the power generating system 1 is caused by two factors. Firstly, there is the underlying, steady state, or mean loading caused by the water current flow, and by the rotation of the rotor of the rotor assembly. Secondly, there is transient, or short term, loading. Transient loading can be caused by shear flow (caused by flow speed slowing closer to the bed of the body of water because of frictional effects), by turbulence (for example turbulence that occurs naturally, or is caused by other generating systems or vessels), or by the effect of waves. As mentioned above, this loading may be of any form: structural, mechanical, electrical and/or thermal.

The processor 20 may determine the loading on the system using a number of different techniques, or by using a suitable combination of those techniques. Some examples will now be explained in more detail.

In a first example, the condition information includes direct measurements of the loading at predetermined parts of the system. For example, suitable measurement apparatus and devices may be employed to measure the loading on the support structure 2, the power generating apparatus 4, the mounting portion 6, and/or the rotor assembly 10 and/or components thereof. These load measurements are then used to derive control signals for controlling the operation of the system.

In another example, the parameter information is used to derive loading conditions from stored model data. Such model data includes information relating to steady state conditions, derived in advance by modeling a plurality of ideal, steady state operations. Data relating to the steady state loads are stored in the data storage unit 22 of the control unit 16 as loading model data. In addition to the steady state model, the loading model data may also include information relating to predicted effects of transient loading, which occurs during short term conditions in the water flow. In one example, the transient loads are included in the model data and the condition information is used to derive expected transient loading conditions from the stored model data.

In another example, these techniques are combined. The steady state loading is derived from predetermined model data, and real-time measurement over a predetermined time period is used to derive the actual transient loading experienced by the system over that predetermined time period.

In another example, an inclinometer is used to determine the inclination of the power generating apparatus 4, and/or the relative inclination (or tilt) between the power generating apparatus 4 and the support structure 2. The inclinometer produces a signal indicative of this inclination, which can be used to derive the loading being experienced by the system. The relationship between the inclination and the loading experienced by the system has been found to be relatively straightforward to calculate.

In another example, a desired power output P is determined from the comparison of present loading and desired loading, and the system is controlled in order that the output power tends to the desired output power P, subject to the normal and well-known constraints and characteristics of control systems. The control of output power P may be by any suitable technique, for example generator torque control, and/or blade pitch angle control.

Figure 5:
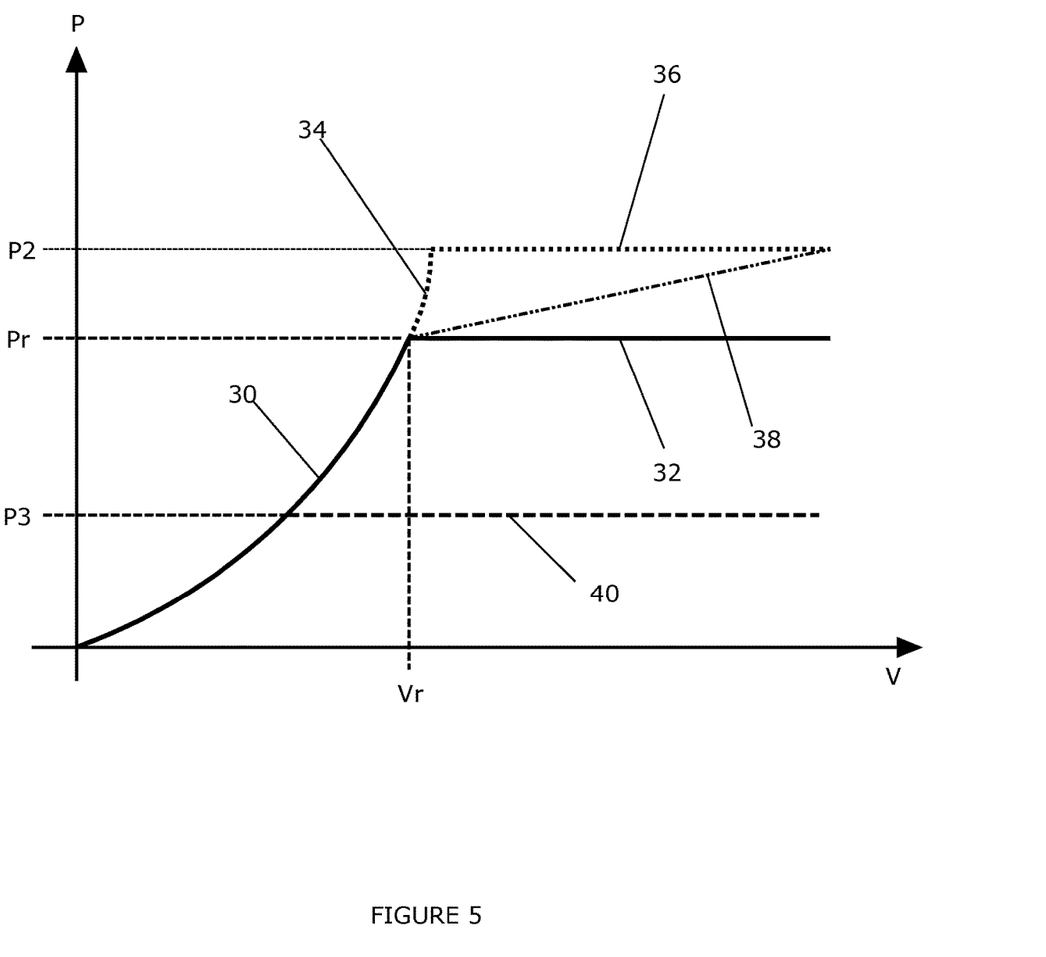
FIG. 5 is a graph illustrating operating characteristics of a water current power generation system operated in accordance with a method embodying an aspect of the present invention.

A control process that adjusts the output power P in accordance with the principles of the present invention will be described below with reference to FIG. 5 which is a graph illustrating output power P as a function of flow speed V. This graph is somewhat simplified in order to demonstrate the principles of a method embodying the present invention, and represents the operating profile for a particular rotor/generator. It will be readily appreciated that the principles of the present invention are applicable to the control and operation of water current turbine apparatus having different operating characteristics.

Using existing control strategies, the generating device 4 operates along the solid line 30-32. At flow speeds below a rated value Vr, the generating device 4 operates to generate below rated power illustrated by the line portion 30. At the rated flow speed Vr, the generating device operates at a rated operating point 32, at which a rated power Pr is produced by the generating device 4. The rated power Pr is the power level at which the generating apparatus 4 is designed to operate, for example 1 MW. As the flow speed increases above Vr, the generator 12 is controlled so that the output power is capped at the rated power level, Pr, in order that loads on the system are kept within a known and acceptable range.

However, the system components are designed with additional loading in mind, so that the system is able to withstand the steady state loading in combination with transient loading. The design process includes modeling of the transient loading so that the overall loading to be expected in a given set of conditions can be predicted. For example, transient loading due to waves can be modeled in terms of wave height, wave period, and device depth, and the resulting transient loading data stored for use in controlling the generating apparatus.

In the case where the combined measured steady state and transient loadings remain under a predetermined threshold value, the operating output power of the apparatus may be increased, whilst the overall loading on the apparatus remains within acceptable levels. In the example shown in FIG. 5, the control of the power generating apparatus is such that as the flow velocity rises further, then the output power P is allowed to rise to a second level P2, higher than the rated level Pr, along the dotted line 34. The generator may then be controlled to maintain this output power P2, as indicated by the dotted line 36. In one example, the increased power level may be 20% higher than the rated power level.

Alternatively, the processor 20 may generate control signals that cause the generator 12 to operate along a different power/flow speed trajectory, such as that indicated by the dashed line 38. It will be appreciated that the generator can be controlled to follow any desired trajectory to an operating output power level for a given flow speed.

If the measured transient loading increases, then the operating output power of the generator is moved to a point where the combined measured steady state and transient loadings are once again below a predetermined level. In some circumstances, the transient loading may be so high that the operating point may be set below the rated power level, as illustrated by the operating point 40, so as to reduce the steady state loading. This reduced power level may enable the power generating system to continue generating power for a longer period of higher transient loading than would otherwise be the case. In previous control schemes, higher transient loading leads to the shutdown of the generating apparatus until the transient loads fall below a suitable level. In one example, the reduced power level may be 20% lower than the rated power Pr.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A water current power generating system, comprising:
    a support structure for locating on a bed of a body of water;
    a water current turbine device mounted on the support structure, the water current turbine device comprising a main body and a rotor assembly rotatably mounted to the main body;
    a measurement unit operable to determine operating information relating to operation of the system, the operating information comprising operating condition information relating to a plurality of operation conditions of the system, the plurality of operating conditions comprising, at least, an inclination of the main body of the turbine device with respect to the support structure, the measurement unit receiving, at least, the inclination of the main body as measured by an inclinometer of the system; and
    a controller operable to determine loading on the system based on the inclination of the main body, and to adjust a controlled parameter of the system such that loading on the system falls below a predetermined threshold value,
    wherein the measurement unit and the controller are housed within the main body; and
    the controller is operable to store, in advance of power generating operation of the system, load model information relating to expected loading on the system during such operation, wherein the controller is operable to combine the operating information and the load model information to generate expected loading information.

2. The system of claim 1, wherein the operating information comprises operating parameter information relating to at least one operating parameter of the system.

3. The system of claim 2, wherein the at least one operating parameter of the system is chosen from output power, generator rotational speed, generator torque, rotor rotational speed, and rotor blade pitch angle.

4. The system of claim 1, wherein the plurality of operating conditions further comprises one or more of the following: loading measurements, flow speed, wave height, or turbulence measurements.

5. The system of claim 1, wherein the controlled parameter of the system is chosen from output power, generator torque, generator rotational speed, rotor rotational speed, and rotor blade pitch angle.

6. The system of claim 1, wherein the load model information comprises steady state load information.

7. The system of claim 6, wherein the load model information further comprises transient load information.

8. The system of claim 1, wherein the load model information comprises transient load information.

9. The system of claim 1, wherein the controller is operable to adjust the controlled parameter of the system so as to cause a power output of the system to rise.

10. The system of claim 1, wherein the controller is operable to adjust the controlled parameter of the system so as to cause a power output of the system to fall.

11. A method for controlling the system of claim 1, the method comprising:
    determining the operating information relating to operation of the system;
    determining loading on the system from the operating information; and
    adjusting a controlled parameter of the system such that loading on the system falls below a predetermined threshold value, wherein the operating information comprises operating condition information relating to at least one operating condition of the system.

\* \* \* \* \*